United States Patent Office 3,071,560
Patented Jan. 1, 1963

3,071,560
STABLE VINYL RESIN CONTAINING A REACTION PRODUCT OF EPICHLORHYDRIN AND A SULFONE
Charles A. Fetscher, Short Hills, and Stanley Lipowski, Newark, N.J., assignors to Nopco Chemical Company, Harrison, N.J., a corporation of New Jersey
No Drawing. Filed Feb. 17, 1959, Ser. No. 793,674
9 Claims. (Cl. 260—45.5)

This invention relates, in general, to epoxy resin-type compositions. More particularly, the invention relates to the use of such compositions as stabilizers in vinyl resin-containing formulations.

It is well known that vinyl resins find wide use both in the production of floor tiles and in the manufacture of film and sheeting materials. It is equally as well known that such resins are adversely affected by heat and light. The sensitivity of the resin to each of these elements is evidenced by a marked darkening or discoloration of the finished product. A serious technological problem is thus created since both vinyl floor tiles and vinyl film and sheeting are produced by methods which involve the use of rather high temperatures.

In order to eliminate, or at least minimize, the tendency of vinyl floor tile and vinyl film and sheeting to darken or discolor during their production and processing, it has become a common industrial practice to use a stabilizer composition as an ingredient of the formulations used in producing finished vinyl resin-containing products. Certain stabilizers of the prior art have proven to be quite effective. However, a majority of the proposed prior art stabilizers have been found to be unsatisfactory for their intended use.

It is the object of this invention to provide compositions which will stabilize vinyl resins against discoloration or darkening resulting from their exposure to heat or light.

It is a more particular object of the invention to provide new and improved stabilizing compositions which are equally well suited for use either in the production of vinyl floor tiles or in the production of vinyl film and sheeting materials.

Other objects of the invention will be obvious and they will, in part, appear hereinafter.

We have found that vinyl resins are stabilized efficiently and effectively by a class of compounds which will be referred to herein as sulfone epoxy resins. They are prepared by the alkali-catalyzed condensation of 1-chloro-2,3-epoxy propane, or, as it is more commonly called epichlorhydrin, with a sulfone, or a mixture of sulfones, having the general formula:

$$OH—R—SO_2—R_1—OH$$

in which the formula R and $R_1$ are each, and independent of the other, selected from the group consisting of phenyl and methyl phenyl radicals. Thus, for example, in the preparation of our products one can employ sulfones, or mixtures containing sulfones, having the formulas:

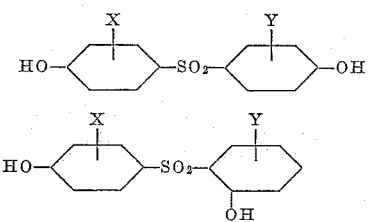

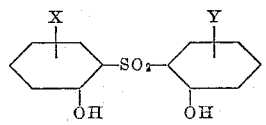

In the foregoing formulas, X and Y both represent, but each independent of the other, hydrogen atoms and methyl groups. Where either X or Y, or both of them, represent a methyl group, that group can be linked to a carbon atom of the phenyl ring at a position ortho-, meta- or para- to the phenolic hydroxy groups.

Sulfones of the type described are prepared by the reaction of either phenol or ortho-, meta- or para-cresol with sulfuric acid in a ratio of about two mols of phenol or the cresol for each mol of sulfuric acid.

The process by which the stabilizers, that is, the sulfone epoxy resin compositions, of our invention are prepared is such that it is readily adaptable to commercial plant scale operations. In general, our products are prepared by reacting the sulfone with epichlorhydrin, in the presence of an alkali, at a temperature within the range of from about 40° C. to about 110° C. In producing the products, a ratio of at least two mols of epichlorhydrin will be used for each mol of the sulfone. Preferably, however, a ratio of more than two mols of epichlorhydrin will be used for each mol of the sulfone. Although the product produced as disclosed herein may best be characterized as a complex mixture of glycidyl ethers, the principal component of the mixture will have the general formula:

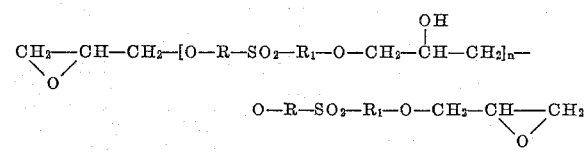

in which R and $R_1$ each, and independent of the other, represent phenyl and methyl phenyl radicals and in which $n$ is zero or the integer 1, 2, 3, 4, etc.

In theory, in order to obtain the monomeric diglycidyl ether of the sulfone, that is,

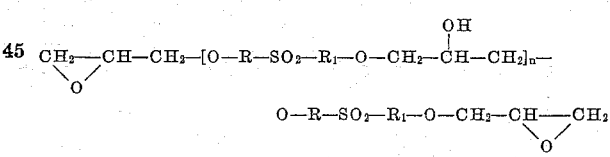

where $n$ is equal to zero, a ratio of two mols of epichlorhydrin per mol of sulfone would have to be used. It has been found, however, that when epichlorhydrin and the sulfone are reacted in a two to one molar ratio, the monomeric diglycidyl ether constitutes a rather small percentage of the total weight of the reaction product. Apparently, when such molecular proportions are used, the epoxy groups of the product react with the still available free phenolic hydroxyl groups to build a long chain polymer. On the other hand, the use of molecular proportions of epichlorhydrin and sulfone which exceed the ratio of 2 to 1, for example, 4 to 1 or greater, appears to favor the formation of the monomeric diglycidyl ether. The use of excess epichlorhydrin, for example, the use of a ratio of up to about 15 mols of epichlorhydrin per mol of sulfone, decreases the quantity of free phenol present in the system and, hence, reduces, to a large extent, the amount of phenol available for polymerization. By keeping polymerization at a minimum we obtain a product having both an epoxide equivalent of relatively low order of magnitude and a 1,2-epoxy equivalency approaching two. This we have found to be desirable. The expression "epoxide number," well known in the art, is used to denote the number of grams of resin containing one gram-equivalent of epoxide. By definition, therefore, compounds of low "epoxide number" are richer in epoxy content than products of high epoxide number. We have found sulfone epoxy resins of this type to be superior stabilizers. The expression "1,2-epoxy equivalency" is used to denote the average number of 1,2-epoxy groups present in the product. Since the products of our invention are mixtures of the diglycidyl ether monomer with other products, some of which may contain but a single epoxy group, the 1,2 epoxy equivalent of our products will, in some instances, be less than two. The use of a ratio of two mols of epichlorhydrin for each mol of sulfone will, of course, insure the production of a sulfone epoxy resin having a 1,2-epoxy equivalency which is greater than one. However, the use of a ratio of more than about 2 mols of epichlorhydrin for each mol of sulfone, for example, up to about 15 mols of epichlorhydrin per mol of sulfone, will not only result in the production of a product having an epoxide equivalent of lower order of magnitude but also it will result in the production of a product whose 1,2-epoxy equivalency more closely approaches the desired two. However, while molecular proportions of epichlorhydrin to sulfone which are greater than the ratio of 15 to 1 could be used, if desired, no advantage has yet been found in the use of such ratios.

The foregoing general remarks concerning the production of our products will be more easily understood by a consideration of the more detail description of the process which follows. Our products are prepared readily by a process which involves first dissolving a suitable sulfone in an aqueous solution containing about 10% by weight of sodium hydroxide. The aqueous alkali solution should be used in a sufficiently large amount to provide about 2.0 mols of alkali per mol of sulfone. Excess alkali, as, for example, up to about 4.0 mols of alkali can be introduced into the reaction system if desired. Furthermore, while we prefer to employ a 10% by weight aqueous alkali solution in producing our products, the invention is not to any extent restricted to the use of a solution having such a concentration. More dilute solutions or more concentrated solutions can be employed. Seldom, if ever, however, will any advantage be gained by the use of a solution which is more dilute than 5.0% by weight or more concentrated than 20.0% in its alkali concentration. The dissolution of the sulfone in the aqueous alkali can be accomplished at room temperature, if desired, or at any temperature up to about 50° C. Thereafter, epichlorhydrin is added gradually to that solution. During the addition of the epichlorhydrin, the reaction mixture should be stirred continuously and maintained at a temperature within the range of from about 40° C. to about 45° C. When addition of the epichlorhydrin has been completed, the reaction mixture is heated slowly, with stirring, to a temperature of about 95° C. It is maintained at or around that temperature for a period of from about 4 to about 5 hours. At the end of the heating period, the product is washed with water until it is neutral in reaction. It those cases in which the relatively large excess quantity of epichlorhydrin has been used initially, the reaction mixture should be subjected to steam distillation, prior to washing, to separate the reaction product from any unreacted epichlorhydrin present. After washing, or after steam distillation and washing, the fluid mass which is obtained is then heated at a temperature of about 110° C. for 2 to 3 hours, preferably in a vacuum oven. Thereafter, and optionally, the product may be heated in the atmosphere at 130° C. for about 3 hours. The latter step, called heat-hardening, serves to raise the softening point of the resin to some extent. In most instances, however, even in the absence of heat-hardening, a solid product will be obtained.

The foregoing method for preparing the sulfone epoxy resins of our invention is given only by way of example. It will be readily apparent to persons skilled in the art that, if desired, the reaction could be carried out in an aqueous alkali medium, other than aqueous sodium hydroxide, as, for example, in aqueous potassium hydroxide, aqueous ammonia, aqueous triethanolamine, etc. It will be obvious also that temperatures above or below those mentioned heretofore could be used in the heating steps and that any necessary changes in the duration of the various heating steps could be made to compensate for the use of such higher or lower temperatures without departing from the scope of the invention.

As indicated previously, the sulfone epoxy resins of our invention are especially adapted for use in vinyl resin-containing systems. They can be employed as stabilizers during the manufacture of floor tiles and during the production of film and sheeting materials from any of the vinyl resins generally used in producing such products. These include, for example, polyvinyl chloride, vinyl acetate-vinyl chloride copolymers, vinyl chloride vinylidene chloride copolymers and other similar polymeric or copolymeric materials. A particularly noteworthy feature of our invention resides in the fact that our novel stabilizers are compatible with other additive materials which are normally employed in the production of vinyl floor tiles or vinyl film and sheeting materials. Thus, the stabilizers of our invention can, and will generally, be employed in formulations which contain lubricants or plasticizers or both. For example, our products can be used in association with the lubricants which are generally used in the manufacture of vinyl floor tiles and vinyl film and sheeting materials. Such lubricants include, among others, (a) metallic soaps, as, for example, lead stearate, calcium stearate, barium stearate, etc., and various heavy metal salts of ricinoleic acid; (b) waxes, as, for example, paraffin wax, carnauba wax, montan wax, etc.; (c) refined oils, as, for example, mineral oil, etc.; or other materials of similar characteristics and comparable utility, as, for example, stearic acid, lauric acid, etc. Furthermore, our products can be incorporated into vinyl resin formulations which contain conventional prior art plasticizing agents. These include compounds, such as, phthalic acid derivatives, as, for example, dioctyl phthalate, butyl benzyl phthalate, dibutyl phthalate, etc.; phosphoric acid derivatives, as, for example, tricresyl phosphate, triphenyl phosphate, etc.; or polyethylene glycol derivatives, as, for example, triethylene glycol esters of relatively low molecular weight fatty acids. Finally, our products can be used in vinyl resin formulations which contain whiteners, such as, titanium dioxide, and pigments, such as chrome oxide green, lead chromate yellow, phtholcyanine blue, etc. and fillers, such as, asbestos.

The use of our novel products as stabilizers in formulations for floor tiles and film and sheeting of vinyl resins will not necessitate any change either in the equipment or in the procedures or techniques, now used in industry. In general, our stabilizer compositions will be employed in precisely the same manner as are the stabilizers presently utilized in the floor tile and film and sheeting industries. Many factors will be involved in determining the optimum amount of stabilizer to be used in any particular instance. These include, for example, the identity of the stabilizer in use, the identity of the resin, the temperatures used in producing the finished product, the duration of the heating steps, etc. One may determine in advance, by a series of laboratory scale trial runs, how much stabilizer should be incorporated into a particular formulation in order to attain the maximum stabilization of the product under a given set of conditions. However, we have found that, in general, completely satisfactory results will be obtained by the use of from about 0.5% to about 15.0% by weight of stabilizer, based on the weight of vinyl resin present in the formulation. Furthermore, if desired, our stabilizer compositions can be used in combination with other compositions which contribute to stability as, for example, organic phosphites, barium, cadmium and zinc soaps and certain other epoxy resins.

The products of our invention will be found to exert a substantial effect upon the heat and light stability of compositions made from vinyl resins. The protection afforded is in most instances superior, to that provided by other known stabilizer compositions. Products, that is, vinyl floor tiles and vinyl film and sheeting materials, produced from formulations which contain our sulfone epoxy resins as stabilizers are characterized by a minimum amount of any discoloration attributable to the high temperatures used in their production.

In the examples which follow hereinafter, the use of our products in specific floor tile and film and sheeting formulations will be shown. It will be immediately evident to persons skilled in the art that changes can be made in these formulations, both in the identity of the ingredients used and in the quantities thereof employed. In general, the sulfone epoxy resins of our invention can be used as the stabilizing ingredient in any formulation for a floor tile or film or sheeting material containing a vinyl resin. Hence, the examples which follow, insofar as they show the use of our products in particular formulations, are exemplary only and they should not be construed as limiting the invention to the use of the stabilizers in connection with the ingredients and the quantities thereof shown.

For a fuller understanding of the nature and objects of our invention, reference may be had to the following examples which are given merely as further illustrations thereof and are not to be construed in a limiting sense. All parts given in the examples are parts by weight unless otherwise indicated.

*Example I*

In this example, a sulfone epoxy resin was prepared by reacting dihydroxy diphenyl sulfone with epichlorhydrin. The dihydroxy diphenyl sulfone employed was the product of the reaction of 2.0 mols of commercially available U.S.P. phenol with 1.0 mol of sulfuric acid (98%). While the sulfone thus obtained, and used herein, was predominantly the 4,4'-hydroxy isomer, it also contained a relatively small quantity of the 4,2'-hydroxy isomer and a trace of the 2,2'-hydroxy isomer.

In the production of the sulfone epoxy resin of the example, dihydroxy diphenyl sulfone was first dissolved in 10% aqueous sodium hydroxide solution at a temperature of about 50° C. A sufficient quantity of 10% sodium hydroxide solution was used to provide a ratio of about 2.04 mols sodium hydroxide for each mol of sulfone to be dissolved therein. The solution was cooled to a temperature within the range of from about 40° C. to 45° C. and epichlorhydrin was added to it slowly. The addition of the epichlorhydrin took about 30 minutes and, during that time, the reaction mixture was continuously stirred and maintained at a temperature within the range of from about 40° C. to about 45° C. A sufficient quantity of epichlorhydrin was added to provide the reaction mixture with a ratio of 4.0 mols of epichlorhydrin for each mol of sulfone.

When the addition of the epichlorhydrin to the sulfone had been completed, the reaction mixture was heated, with stirring, at such a rate as to gradually reach a maximum temperature of about 95° C. over a period of about 60 minutes. The reaction mixture was maintained at that temperature for a period of about 4 hours. During this heating step, the reaction mixture was stirred continuously. Thereafter, the mixture was washed with hot water until neutral in reaction. The fluid reaction mixture was subsequently heated, in a vacuum oven, at a temperature of 110° C. for about 2 hours, following which the mass was heated in the atmosphere for 3 hours at a temperature of about 130° C.

A solid resin product was obtained having a 1,2-epoxy equivalency of about 2, an epoxide equivalent of 720 to 728 and a softening point of 66° C., as determined by Durrans Mercury Method.

The product of this example was evaluated for use as a stabilizer in a vinyl floor tile as follows. At room temperature, a mixture of the following named ingredients was first prepared.

| | Parts |
|---|---|
| Vinyl resin | 100 |
| Dioctyl phthalate | 25 |
| York Whiting | 140 |
| Asbestos | 200 |
| An epoxy ester-type plasticizer | 5 |
| Titanium dioxide | 25 |

The vinyl resin employed was a vinyl acetate-vinyl chloride copolymer consisting of about 83% vinyl chloride and 17% vinyl acetate. The plasticizer component of the mixture was an epoxidized fatty ester type composition, having an average molecular weight of about 1000, and acid number (maximum) of 1.0 mgm. KOH/gm. and a saponification number of 183 mgm. KOH/gm., identified as Paraplex G–62.

To the above mixture, 6.0 parts of the sulfone epoxy resin of this example was added. The entire mass was then mixed at room temperature until it became doughlike in appearance and consistency. The mass was, thereafter, calendered on a two roll rubber mill which was heated to a temperature of 300° F. The passage of the mass between the revolving rolls compressed it into a continuous thin sheet. This sheet adhered to the hot surface of one of the rolls. The adhesion of the mass to the roll and the continuous revolution of the rolls caused the sheet to be constantly heated and continuously compressed until it finally assumed the form of a pliable, translucent sheet. After thus processing for five minutes, the sheet was removed from the rolls and it was placed in a forced draft oven which was heated to 325° F. and retained therein, at that temperature for a period of 3 hours.

For comparative purposes, the above procedure was repeated, in every detail, except that a conventional prior art stabilizing composition was used in place of the sulfone epoxy resin of this example. The stabilizer used in this instance was a mixture of 50% by weight of an epon resin made from Bis-phenol A identified as Epon 1001, and 50% by weight of a mixture of barium laurate and cadmium laurate. The barium and cadmium laurate mixture was composed of a ratio of 2 parts by weight of barium laurate for each part by weight of cadmium laurate. Epon 1001 is a solid product at ordinary room temperatures having a softening or melting point, as determined by Durrans' Mercury Method, of 64° C. to 76° C. and an epoxide equivalent of 450 to 525. The stabilizer used herein for control purposes is commercially available and it is widely used in the vinyl floor tile industry.

The respective products were compared for discoloration by determining the diffuse reflectance of their surfaces using a Photovolt Photoelectric Reflection Meter, Model 610. A determination of the diffuse reflectance of the surface of a material gives a relatively accurate determination of the lightness or darkness of that surface. A dark or discolored surface will tend to absorb light and, hence, have a low diffuse reflectance. A light surface will reflect light and, hence, have a higher diffuse reflectance. Thus all things else being equal, or relatively so, for example, the roughness or smoothness of the respective surfaces, a material having a lighter colored surface will have a higher diffuse reflectance than a material having a darker or discolored surface.

The reflectance determinations were made first on samples of each of the tiles prior to placing same in the oven. Additional reflectance determinations were then made after the tiles had been in the oven for 30, 90, 120, 150 and 180 minutes. The results of this test are summarized in the table which follows:

| Time in Oven at 325° F. | Reflectance of Tile | |
| --- | --- | --- |
|  | Stabilized Using Product of the Example | Stabilized Using Prior Art Stabilizer |
| 0 | 47 | 41 |
| 30 minutes | 46 | 11 |
| 90 minutes | 39 | 13 |
| 120 minutes | 34 | 14 |
| 150 minutes | 32 | 14 |
| 180 minutes | 29 | 15 |

The foregoing results clearly demonstrate that, of the two products tested, the product, stabilized using the sulfone epoxy resin of the present example, was much superior. These determinations confirmed visual inspection of the tiles since, even to the naked eye, the tiles which were stabilized using the prior art product were far darker in color than the tiles which were stabilized using the product of the example.

*Example II*

In the example, a sulfone epoxy resin was produced by reacting epichlorhydrin with the sulfone employed in Example I, namely, dihydroxy diphenyl sulfone, in sufficient quantities as to provide the reaction system with a ratio of 10.0 mol of epichlorhydrin for each mol of sulfone present.

The procedure for the production of the sulfone epoxy resin of this example was similar, in all respects, to the procedure used in producing the product of Example I. Thus, the solid sulfone was first dissolved in 10% aqueous sodium hydroxy solution at a temperature of about 50° C. The quantity of 10% aqueous sodium hydroxide solution used was sufficient to provide the system with a ratio of 2.04 mols of sodium hydroxide for each mol of sulfone dissolved in the solution. The mixture was cooled to a temperature within the range of from about 40° C. to about 45° C. and epichlorhydrin was added thereto. The addition of the epichlorhydrin was accomplished gradually over a period of about 30 minutes and, during that time, the reaction mixture was continuously stirred and maintained at a temperature of about 40° C. to 45° C. When all of the epichlorhydrin had been added, the reaction mixture was heated, with continuous stirring, slowly to a temperature of about 95° C. The rate of heating was such that the reaction mixture reached 95° C., gradually, over a period of about 60 minutes. The mixture was maintained at that temperature for a period of about 4 hours. At the end of that time, the reaction mixture was thereafter subjected to steam distillation to separate the desired reaction product from excess quantities of unreacted epichlorhydrin which were present in the mixture. The produce which remained after the steam distillation step was washed with hot water until neutral in reaction. The fluid reaction mass was thereafter heated, in a vacuum oven, for a period of about 2 hours at a temperature of 110° C., following which it was heated in the atmosphere at a temperature of about 130° C. for a period of about 3 hours.

A solid resin was obtained having a 1,2-epoxy equivalency of approximately 2, an epoxide equivalent of 650 and a softening point of 68° C., as determined by the Durrans' Mercury Method.

*Example III*

The procedure of Example II was repeated in every detail, using the same ingredients and, with but one exception, the same quantities thereof as were used in that example. In the present example, the quantity of epichlorhydrin employed was sufficient to provide the reaction system with 15.0 mols of epichlorhydrin for each mol of sulfone present, whereas in Example II the mol ratio of epichlorhydrin to sulfone was 10 to 1.

The sulfone epoxy resin which was obtained had a 1,2-epoxy equivalency of about 2 and an epoxide equivalent of 580. Its softening point was below room temperature.

*Example IV*

A sulfone epoxy resin was prepared in precisely the same manner as were the resins of the previous examples. In this example, however, the sulfone employed was the product produced by the reaction of commercial o-cresol and sulfuric acid (100%) in a molar ratio of 2 mols to 1 mol. The commercial o-cresol which was employed in the formulation of the sulfone was a substantially pure product yielding 3,3'-dimethyl-4,4'-dihydroxy diphenyl sulfone which melted at 258° C.

In producing the desired product, the sulfone was first dissolved in 10% aqueous sodium hydroxide solution. A sufficient quantity of sodium hydroxide solution was used to provide the system with a ratio of 2.04 mols of sodium hydroxide for each mol of sulfone. The dissolution of the sulfone in the aqueous sodium hydroxide solution was carried out with the solution heated to a temperature of about 50° C. Thereafter, this solution was cooled to a temperature of from about 40° C. to about 45° C. and epichlorhydrin was added slowly thereto. A sufficient quantity of epichlorhydrin was added to provide the reaction system with a ratio of 4.0 mols of epichlorhydrin for each mol of sulfone. Addition of the epichlorhydrin to the sulfone was accomplished gradually over a period of about 30 minutes and, during that time, the mixture was continuously stirred and maintained at a temperature within the range of from about 40° to 45° C.

After the addition of the epichlorhydrin to the sulfone solution had been completed, the reaction mixture was heated, with continuous stirring, at such a controlled rate that a temperature of about 95° C. was reached gradually over a period of about 60 minutes. The reaction mixture was maintained at that temperature for about 4 hours. Thereafter, the reaction mixture was washed with hot water until neutral in reaction. The fluid mass was then heated in a vacuum oven at a temperature of 110° C. for about 2 hours, following which it was heated in the atmosphere for 3 hours at a temperature of about 130° C.

A solid resin composition, having a 1,2-epoxy equivalency of approximately 2, an epoxide equivalent of 488 to 492 and a softening point of 73° C., as determined by Durrans' Mercury Method, was obtained.

The product of this example was evaluated for use as a stabilizer in the same manner as was the product of Example I. It was substituted in the floor tile formulation, shown in that example, for the sulfone epoxy resin of Example I. The table which follows hereinafter summarizes the results of the reflectance determinations:

| Time in Oven at 325° F. | Reflectance of Tile | |
| --- | --- | --- |
|  | Stabilized Using Product of the Example | Stabilized Using Prior Art Stabilizer |
| 0 minutes | 46 | 41 |
| 30 minutes | 42 | 11 |
| 90 minutes | 37 | 13 |
| 120 minutes | 26 | 14 |
| 150 minutes | 24 | 14 |
| 180 minutes | 24 | 15 |

These results, when considered in conjunction with the results reported in Example I, demonstrate that the product of this example is a superior stabilizer for vinyl resins.

*Example V*

The procedure of example IV was repeated in every detail, using the same ingredients and, with but one exception, the same quantities thereof as were used in that example. In the present example, the quantity of epichlorhydrin employed was sufficient to provide the reaction system with 5.0 mols of epichlorhydrin for each mol of sulfone present whereas in Example IV, the mol ratio of epichlorhydrin to sulfone was 4 to 1.

The sulfone epoxy resin which was obtained had a 1,2-epoxy equivalency of about 2, an epoxide equivalent of 358 and a softening point of 73° C., as determined by Durrans' Mercury Method.

*Example VI*

The procedure of Example IV was once again repeated in every detail, using the same ingredients, and with but one exception, the same quantities thereof as were used in that example. In this example, the quantity of epichlorhydrin employed in producing the desired sulfone epoxy resin was sufficient to provide the reaction system with 10.0 mols of epichlorhydrin for each mol of sulfone.

The sulfone epoxy resin obtained in this example had a 1,2-epoxy equivalency of about 2, an epoxide equivalent of 455 and a softening point of 65° C., as determined by Durrans' Mercury Method.

*Example VII*

To further demonstrate the effectiveness of the products of this invention as stabilizers in vinyl floor tile formulations, the following test was conducted. At room temperature, two separate mixtures of the following named ingredients were first prepared:

| | |
|---|---|
| Vinyl resin_____pounds__ | 100 |
| Asbestos _____do____ | 175 |
| Titanium dioxide_____do____ | 25 |
| Calcium carbonate_____do____ | 120 |
| Stearic acid_____ounces__ | 10 |
| Dioctyl phthalate_____pounds__ | 50 |
| Metallic soap mixture_____do____ | 6 |

The vinyl resin used was a copolymer comprising 83% vinyl chloride and 17% vinyl acetate. The metallic soap mixture was a blend of barium and cadmium laurate in a ratio of 2 parts by weight of barium laurate for each part by weight of cadmium laurate.

To one of these mixtures, 5.0 pounds of the product of Example I was added. To the other, 5.0 pounds of Epon 1001 was added. These mixtures were milled, as was the case in Example I, at a temperature of 300° F. for 5 minutes and the products were heated in an oven at 325° F. for 180 minutes.

The finished floor tile, thus obtained, was subjected to the reflectance determinations described heretofore. The results of the test were as follows:

| Time in Oven at 325° F. | Reflectance of Tile | |
|---|---|---|
| | Stabilized Using Product of the Example | Stabilized Using Prior Art Stabilizer |
| 0 minutes_____ | 52 | 46 |
| 90 minutes_____ | 48 | 28 |
| 120 minutes_____ | 47 | 24 |
| 150 minutes_____ | 42 | 24 |
| 180 minutes_____ | 41 | 27 |

The foregoing table demonstrates the truly remarkable stabilizing effect that can be obtained using the sulfone epoxy resins of the invention. Moreover, even to the naked eye, the product stabilized using our product remained very nearly its original white color whereas the product stabilized using the prior art stabilizer was definitely discolored.

*Example VIII*

In this example, sulfone epoxy resins of our invention were employed to stabilizer vinyl film and sheeting material. Three separate mixtures of the following named ingredients, in the designated proportions, were prepared at room temperature.

| | |
|---|---|
| Polyvinyl chloride_____pounds__ | 100 |
| Dioctyl phthalate_____do____ | 50 |
| Bluing compound_____ounces__ | 2 |
| Metallic soap mixture_____pounds__ | 2 |

The metallic soap mixture of the formulation was a mixture of barium and cadmium laurate in a ratio of 2 parts by weight to 1 part by weight, respectively.

To one of the three mixtures thus prepared, 2.0 pounds of Epon 1001 was added. To the second of the three mixtures, 2.0 pounds of the product of Example I was added. To another of the three, 2.0 pounds of the product of Example IV were added. These mixtures were thereafter calendered on a two roll rubber mill which was heated to a temperature of 340° F. Each product was milled for 40 minutes.

In each case, a pliable, transluscent sheet for film was obtained. The sheets produced from the formulation containing the products of Examples I and IV were noticeably less yellow in color than the sheet produced from the formulation containing Epon 1001 as the stabilizer.

Having described our invention, what we claim as new and desire to secure by Letters Patent is:

1. A heat and light stable vinyl resin-containing composition consisting essentially of, in intimate admixture, a polyvinyl resin selected from the group consisting of vinyl acetate-vinyl chloride copolymers, vinyl chloride-vinylidene chloride copolymers and polyvinyl chloride and a sulfone epoxy resin stabilizer produced by heating, in the presence of an alkali and at a temperature within the range of from about 40° C. to 110° C., a ratio of from about 2 to about 15 mols of epichlorhydrin with about 1.0 mol of a sulfone having the formula $$OH-R-SO_2-R_1-OH$$

in which formula R and $R_1$ are selected from the group consisting of phenyl and methyl phenyl radicals.

2. A heat and light stable vinyl resin-containing composition consisting essentially of, in intimate admixture, a polyvinyl resin selected from the group consisting of vinyl acetate-vinyl chloride copolymers, vinyl chloride-vinylidene chloride copolymers and polyvinyl chloride and from about 0.5% to about 15.0%, by weight, based on the weight of the polyvinyl resin, of a sulfone epoxy resin stabilizer produced by heating, in the presence of an alkali and at a temperature within the range of from about 40° C. to 110° C., from about 2 to about 15 mols of epichlorhydrin with about 1.0 mol of a sulfone having the formula $$OH-R-SO_2-R_1-OH$$

in which formula R and $R_1$ are selected from the group consisting of phenyl and methyl phenyl radicals.

3. The composition of claim 2 wherein the sulfone epoxy resin stabilizer employed is the product of the reaction of epichlorhydrin and a sulfone having the formula $$OH-R-SO_2-R_1-OH$$
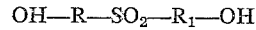

in which formula R and $R_1$ represent phenyl radicals.

4. The composition of claim 2 wherein the sulfone epoxy resin stabilizer employed is the product of the reaction of epichlorhydrin and a sulfone having the formula $$OH-R-SO_2-R_1-OH$$

in which formula R and $R_1$ represent methyl phenyl radicals.

5. A heat and light stable vinyl resin-containing composition consisting essentially of, in intimate admixture, a polyvinyl resin selected from the group consisting of vinyl acetate-vinyl chloride copolymers, vinyl chloride-vinylidene chloride copolymers and polyvinyl chloride and from about 0.5% to about 15.0%, by weight, based on the weight of the polyvinyl resin, of a sulfone epoxy
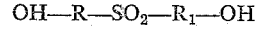

resin produced by heating, in the presence of sodium hydroxide and at a temperature within the range of from about 40° C. to 100° C., a ratio of about 4.0 mols of epichlorhydrin and 1.0 mol of a sulfone having the formula $$OH-R-SO_2-R_1-OH$$

in which formula R and $R_1$ represent phenyl radicals.

6. A heat and light stable vinyl resin-containing composition consisting essentially of, in intimate admixture, a polyvinyl resin selected from the group consisting of vinyl acetate-vinyl chloride copolymers, vinyl chloride-vinylidene chloride copolymers and polyvinyl chloride and from about 0.5% to 15.0%, by weight, based on the weight of the polyvinyl resin, of a sulfone epoxy resin produced by heating, in the presence of sodium hydroxide and at a temperature within the range of from about 40° C. to 110° C., a ratio of about 10.0 mols of epichlorhydrin and about 1.0 mol of a sulfone having the formula $$OH-R-SO_2-R_1-OH$$

in which formula R and $R_1$ represent phenyl groups.

7. A heat and light stable vinyl resin-containing composition consisting essentially of, in intimate admixture, a polyvinyl resin selected from the group consisting of vinyl acetate-vinyl chloride copolymers, vinyl chloride-vinylidene chloride copolymers and polyvinyl chloride and from about 0.5% to 15.0%, by weight, based on the weight of the polyvinyl resin, of a sulfone epoxy resin produced by heating, in the presence of sodium hydroxide and at a temperature within the range of from about 40° C. to 110° C., a ratio of about 4.0 mols of epichlorhydrin and about 1.0 mol of a sulfone having the formula $$OH-R-SO_2-R_1-OH$$

in which formula R and $R_1$ represent methyl phenyl groups.

8. A heat and light stable vinyl resin-containing composition consisting essentially of, in intimate admixture, a polyvinyl resin selected from the group consisting of vinyl acetate-vinyl chloride copolymers, vinyl chloride-vinylidene chloride copolymers and polyvinyl chloride and from about 0.5% to about 15.0%, by weight, based on the weight of the polyvinyl resin, of a sulfone epoxy resin produced by heating, in the presence of sodium hydroxide and at a temperature within the range of about 40° C. to 110° C., a ratio of from about 5.0 mols of epichlorhydrin and about 1.0 mol of a sulfone having the formula $$OH-R-SO_2-R_1-OH$$

in which formula R and $R_1$ represent methyl phenyl radicals.

9. A heat and light stable vinyl resin-containing composition consisting essentially of, in intimate admixture, a polyvinyl resin selected from the group consisting of vinyl acetate-vinyl chloride copolymers, vinyl chloride-vinylidene chloride copolymers and polyvinyl chloride and from about 0.5% to about 15.0%, by weight, based on the weight of the polyvinyl resin, of a sulfone epoxy resin produced by heating, in the presence of sodium hydroxide and at a temperature within the range of from about 40° C. to 110° C., a ratio of from about 10.0 mols of epichlorhydrin and about 1.0 mol of a sulfone having the formula $$OH-R-SO_2-R_1-OH$$

in which formula R and $R_1$ represent methyl phenyl groups.

References Cited in the file of this patent

UNITED STATES PATENTS

| | | |
|---|---|---|
| 2,765,322 | Beavers | Oct. 2, 1956 |
| 2,773,043 | Zukas | Dec. 4, 1956 |
| 2,843,557 | Safford | July 15, 1958 |

OTHER REFERENCES

Lally et al.: "Modern Plastics," volume 27, issue 4 (1949) (page 116 relied upon).

Narracott: "British Plastics," October 1951, pages 341–5 (page 341 relied upon).